United States Patent [19]

Licitis

[11] 3,801,110

[45] Apr. 2, 1974

[54] SOUND RECORD

[75] Inventor: Gunars Licitis, Lombard, Ill.

[73] Assignee: Marvin Glass and Associates, Chicago, Ill.

[22] Filed: Aug. 21, 1972

[21] Appl. No.: 282,377

[52] U.S. Cl. ................................ 274/42 R, 274/44

[51] Int. Cl. ................................ G11b 3/78

[58] Field of Search 179/6 TA, 100.1 C, 100.2 MD; 274/42 R, 44, 18; 58/14

[56] References Cited

UNITED STATES PATENTS

| | | | |
|---|---|---|---|
| 2,680,150 | 6/1954 | Weld | 274/42 R X |
| 2,947,978 | 8/1960 | Poylo et al. | 179/100.2 MD X |
| 3,637,952 | 1/1972 | Hataya et al. | 179/100.2 MD |
| 3,332,690 | 7/1967 | Michetti | 274/42 R |
| 3,110,501 | 11/1963 | Winchell | 274/42 R |
| 3,201,133 | 8/1965 | Matsukata | 274/42 R |
| 3,325,916 | 6/1967 | Greenlee, Jr. | 274/42 R X |
| 2,287,240 | 6/1942 | Haltenhof | 274/42 R |

*Primary Examiner*—Louis R. Prince
*Assistant Examiner*—Charles E. Phillips
*Attorney, Agent, or Firm*—Coffee and Sweeney

[57] ABSTRACT

Disclosed is a novel sound record having a plurality of relatively movable parts with sound track portions on each part. The record parts are locked together for playing purposes but may be released to permit adjustment of the relative positions of the record parts and thereby the sound track portions thereon, to thereby adjust or change the sound tracks which extend over the record parts. In one exemplary embodiment, the record is disc shaped and the relatively adjustable record parts comprise annular concentric portions of the record, with the sound tracks extending over the record parts between the outer periphery and the center of the record. In another embodiment of the invention, the record is of the cylindrical type and the relatively adjustable record parts comprise axially disposed and relatively rotatable cylindrical sections of the record.

9 Claims, 7 Drawing Figures

SOUND RECORD

BACKGROUND AND SUMMARY OF THE INVENTION

This invention relates to sound records of the type having a plurality of recordings thereon.

Sound records of the character described have been known for some time and are being increasingly used in toys, educational devices, entertainment devices, or the like, where a plurality of records are provided on a single record. The recordings are spaced apart, particularly at their beginnings, and form separate recordings which are generally in side-by-side relation on the record. Such recordings hereinafter will be termed "sound tracks." Such records have been used wherein the individual sound tracks on each record may be selected haphazardly, with any complete series of the tracks so selected forming a story or the like. Alternately, such records have been employed where the sound tracks have been correlated to other information, particularly visual information, in entertaining and educational fashion. Most often, the sound tracks are "interleaved" and extend side-by-side from the beginning to the end of the record.

This invention is directed generally to such records of the character described and, particularly, to a sound record having relatively movable or adjustable record parts having sound track portions on each part which may be positioned in registry with different sound track portions on other record parts to provide a plurality of sound tracks extending over the record and over the record parts. With such a record, the number and/or range of the recordings reproducible by the record is vastly increased.

Two exemplary forms of records having relatively adjustable parts are shown and described herein. However, any variety of records which may be adapted to have relatively adjustable parts with sound track portions thereon is well within the concepts of the present invention.

In one form of the invention, the record is generally of the disc type having a generally flat playing area on which the sound track is disposed. The record is revolvable about an axis generally centrally of and perpendicular to the playing area. The movable record parts comprise annular portions of the playing area of generally uniform width and extending 360° about the axis of rotation of the record. The record parts are adjusted to vary the relative positioning of the sound track portions thereon by relative rotation of the record parts about the axis of rotation of the record. Each sound track on the record may include sound track portions on more than one of the relatively adjustable record parts.

With the disc type record, blank circular bands are disposed adjacent the joints of the record parts to separate the sound track portions on one record part from the sound track portions on the other adjacent record parts. A stylus or other appropriate pickup unit thus passes randomly from one record part to the other. The record parts having the blank circular bands thereon have playing areas elevated axially above the adjacent record part which joins the blank band, and the blank circular band is sloped downwardly to facilitate movement of the stylus or other appropriate pickup unit from the record part with the blank band to the adjoining record part. The annular record parts of the disc are releasably locked together for conjoint rotation during audible reproduction of the sound tracks, but the lock means may be released automatically in response to relative axial movement of the record parts to permit the relative rotatable adjustment of the parts.

In the second exemplary form of the invention, the record is generally of the cylindrical type having a cylindrical playing area on which the sound track is exposed. The relatively adjustable record parts comprise cylindrical sections of the cylinder, with sound track portions on the cylindrical sections.

Other features and advantages of the invention will be apparent from the following detailed description taken in connection with the accompanying drawings.

DETAILED DESCRIPTION OF THE INVENTION

Figure 2:
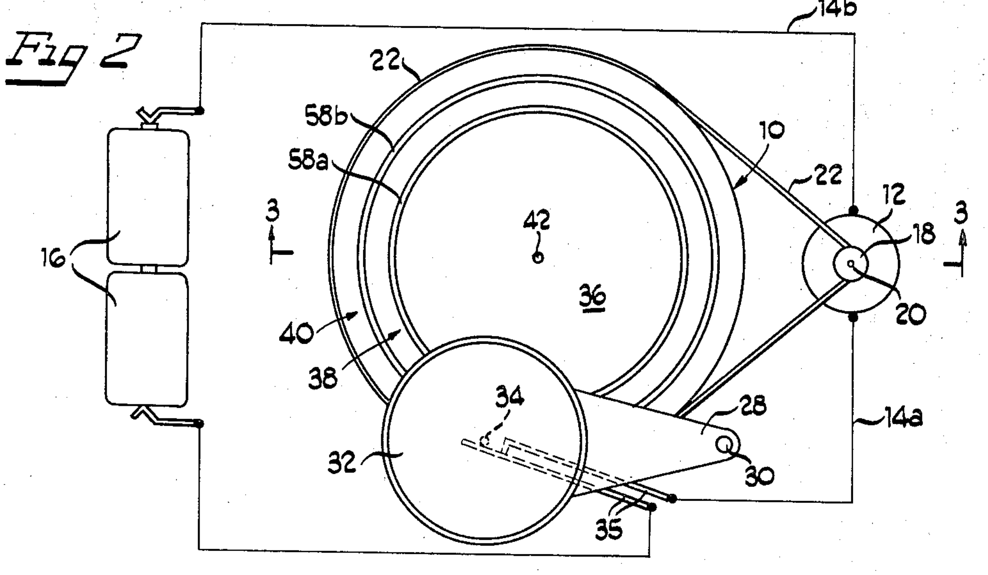
FIG. 2 is a plan view of the record of FIG. 1, on a reduced scale and shown somewhat schematically in conjunction with a battery operated motor and a pickup unit.
Figures 3, 4, 5, 6, 7:
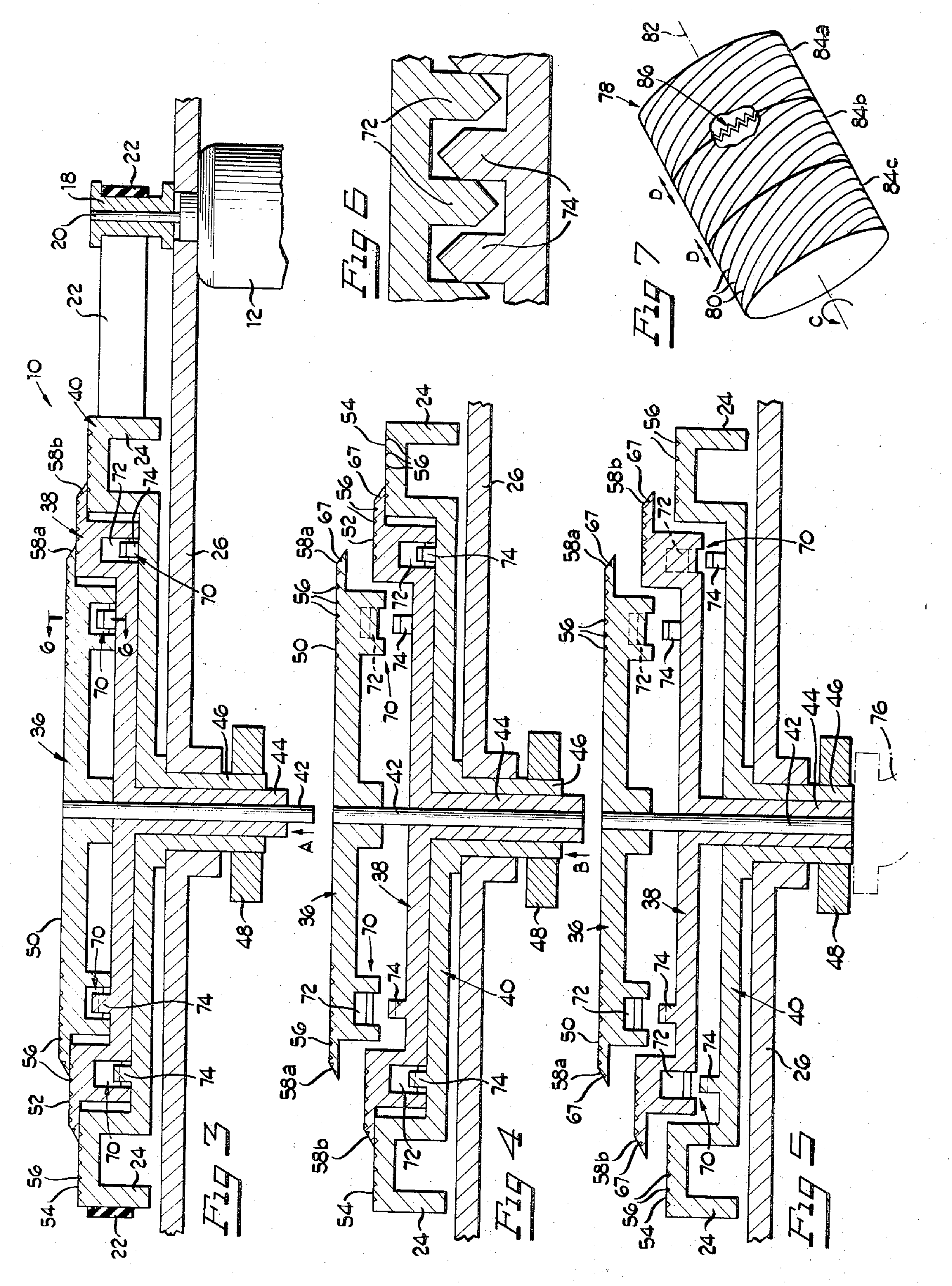
FIG. 3 is a vertical section, on an enlarged scale, taken generally along the line 3—3 of FIG. 2.
FIG. 4 is a vertical section similar to that of FIG. 3 but with the center record part moved axially out of meshed engagement with an intermediate record part.
FIG. 5 is a view similar to that of FIG. 4 but with the intermediate record part also moved out of engagement with the outer record part.
FIG. 6 is a vertical section, on an enlarged scale, taken generally along the line 6—6 of FIG. 3.
FIG. 7 is a somewhat schematic perspective view of a cylindrical type sound record embodying the concepts of the present invention.

Referring to the drawings in greater detail, and first to FIG. 2, a sound record, generally designated 10 and made in accordance with the concepts of the present invention, is shown in conjunction with a motor 12 operatively connected through lines 14*a* and 14*b* to a pair of batteries 16. The batteries power the motor to rotate a pulley 18 (also see FIG. 3) mounted for rotation with a drive shaft 20 of the motor. A drive belt 22 is wrapped about the pulley 18 and about an outer downwardly depending flange 24 (FIG. 3) of the record 10 to rotate the record in response to actuation of the motor 12. The motor is fixed to and the record is rotatably mounted on a supporting base plate 26 (FIG. 3).

An appropriate pickup unit is provided and includes a tone arm 28 (FIG. 2) pivotally mounted at 30, a sound cone 32 and stylus 34. At the outer end of its path, stylus 34 strikes a movable one of two contacts 35 to open the circuit to motor 12. The stylus 34 is adapted for engagement with sound tracks on the record 10, as described hereinafter.

Referring particularly to FIGS. 1 through 5, one form of sound record 10 in accordance with the present invention is shown generally of the disc type. The record is comprised of a plurality of relatively movable parts, generally designated 36, 38 and 40. Each record part is rotatable about and shaped concentric with a center axis defined by the axis of a shaft 42 which is fixed to the center record part 36. The shaft 42 depends downwardly through a cylindrical sleeve 44 on the underside of intermediate record part 38. The sleeve 44, in turn, extends downwardly through an outer cylindrical sleeve 46 which is fixed to the underside of the outer record part 40. The shaft 42 and sleeves 44, 46 all are rotatably journalled concentric to each other in a bracket member 48.

Figure 1:
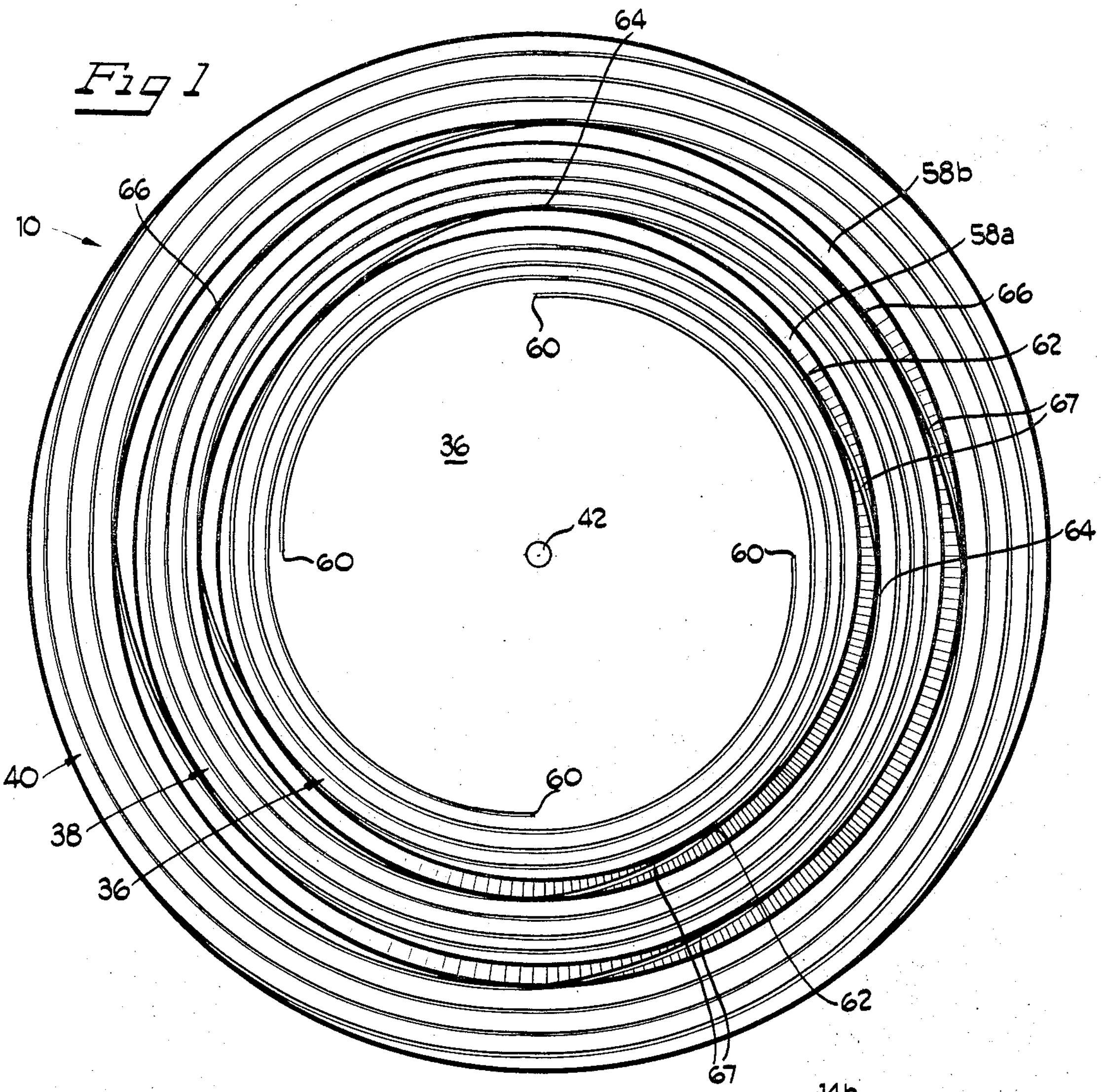
FIG. 1 is a plan view of a sound record, generally of the disc type, made in accordance with the concepts of the present invention.

Each record part 36, 38 and 40 has generally flat playing areas or surfaces 50, 52 and 54, respectively, on which are formed a plurality of sound track portions in the form of sound grooves 56. As shown in FIG. 1, each of the sound track portions for each record part, defined by the sound grooves 56, are defined by generally parallel volute spirals, or side-by-side relationship (sometimes described as being "interleaved"). Blank circular bands or annular spaces 58*a* and 58*b* are provided between the sound track portions of the adjacent record parts 36, 38 and 40. Thus, it can be seen that the sound track portions for the center record part 36 begin at the inner portions of the record, as at 60, and spiral outwardly in the interleaved fashion until they reach the blank band 58*a*, as at 62. Similarly, the sound track portions or grooves of the intermediate record part 38 start at 64 and spiral outwardly until they reach the blank band 58*b*, at 66. The same arrangement is true with the sound track portions on the outer record part 40 until the sound track portions thereof reach the outer periphery of the record.

It therefore is apparent that relative rotational adjustment between the record parts 36, 38 and/or 40 changes the position of registry of the respective sound track portions on one record part with the sound track portions of the other record parts to provide a multiplicity of changeable sound tracks extending over the record from one record part to the other, but interrupted by the bands 58*a*, 58*b*. The bands may be blank but are preferably provided with unrecorded groove portions 67 forming a continuation of the sound track and providing a lead into the succeeding record part. The described form of record provides a random sound reproducing means wherein the continuity of the story, music, etc. is changed at random. Such records may be used, for example, in a variety of games, particularly chance games where moves or other actions may be dictated by the record, as has been done with decks of cards or other random selection devices in the past. The number of possible combinations of messages is determined by or is a function of the number of sound track portions on one record part multiplied by the number of sound track portions on the next record part, which total is multiplied by the number of sound track portions on the next succeeding record part, and so on. For instance, should record parts 36, 38 and 40 each have eleven sound track portions, the number of different full sound track messages on the record would be 1,331 (or 11 × 11 × 11).

As shown in FIGS. 3 through 5, the record parts 36, 38 and 40 are elevated slightly relative to each other, beginning with the center record part 36 elevated above the record part 38 and the record part 38 elevated above the record part 40. The blank bands 58*a* and 58*b* are formed by the outer peripheral edges of the record parts 36 and 38, respectively, the outer peripheral edges being chamfered so that the blank bands 58*a* and 58*b* slope downwardly and outwardly to facilitate movement of the stylus 34 from one record part to the immediately adjacent outer record part. Of course, it is readily apparent that the reverse could be true and the outer record part 40 may be elevated above the immediately adjacent inner record part 38 and so on toward the center of the record, with chamfered inner peripheral edges of the record parts sloping downwardly toward the center of the record.

The record parts 36, 38 and 40 are shown in FIG. 3 in their normal relative axial positions for reproducing the sound tracks on the record. Each record part is releasably locked to its adjacent record part by locking means, generally designated 70. More particularly, the locking means 70 between adjacent record parts comprise interengaging surfaces which, as shown in the drawings and particularly in FIG. 6, comprise a plurality of downwardly depending teeth 72 which are meshed between complementary upwardly protruding teeth 74. These teeth are provided on the underside of the center record part 36 in mesh with teeth on the top side of the intermediate record part 38, as well as on the underside of the intermediate record part 38 in mesh with teeth on the top side of the outer record part 40.

In order to release the locking means 70 and thereby permit relative rotational adjustment of the record parts, the record parts are moved axially relative to each other to disengage the teeth 72, 74. In order to facilitate such axial movement, the shaft 42 for the center record part 36 protrudes downwardly beyond the lower end of sleeve 44 of the intermediate record part 38 and, vice versa, sleeve 44 protrudes downwardly beyond the lower end of sleeve 46 for the outer record part 40. As seen in FIG. 4, by engaging the exposed end of the shaft 42 and urging it upwardly in the direction of arrow A (FIG. 3), until the lower end of the shaft 42 is flush with the lower end of the sleeve 44, the teeth 72 on the underside of the center record part 46 are moved out of mesh with the teeth 74 protruding upwardly from the top side of the intermediate record part 38. Similarly, the intermediate record part 38 may be unlocked from its meshed engagement with the outer record part 40 by engaging and forcing its sleeve portion 44 upwardly in the direction of arrow B (FIG. 4) until the lower end of the sleeve 44 is flush with the lower end of the sleeve 46 for the outer record part 40, as seen in FIG. 5. This relative axial movement may be accomplished manually or by using a manual or synchronized implement 76, shown in phantom in FIG. 5. When the record parts 36, 38 and 40 are relatively rotatably adjusted to bring the sound track portions thereon into desired relative angular disposition, the shaft 42 and sleeves 44 and 46 are disengaged from the implement 76 or a user's hand, or the like, and the record parts will return by gravity to the positions of operation shown in FIG. 3.

It should be pointed out that although the record 10 is shown herein with the blank bands 58*a*, 58*b* providing for random registry of the sound track portions of adjacent record parts, definite or positive registry of the ends of the sound track portions on one or more record parts with the beginnings of sound track portions of adjacent record parts may be provided on the record with the movable parts in accordance with the concepts of the present invention. Deliberate indexing of the record parts, with or without indexing of the pickup unit, can be readily achieved, along with positive coordination of the indexing with other materials such as with related visual information. The number of combinations of sound track portions still would be avilable as afforded by the relatively movable record parts.

FIG. 7 shows a cylindrical type sound record, generally designated 78, having a generally cylindrical outer playing area on which the sound tracks are disposed in the form of interleaved grooves 80. The playing area is revolvable about the main axis 82 of the cylinder, as indicated by the arrow C. The relatively adjustable record parts for this type of sound record comprises cylindrical sections 84*a*, 84*b* and 84*c* which, by appropriate means, may be relatively adjustable by relative rotation about the main axis 82 of the cylinder to change the relative positioning of the sound track portions 80 on adjacent cylindrical sections. In order to adjust the cylindrical sections, appropriate provision can be made for the sections to be relatively moved axially in the direction of arrows D to disengage appropriate interengaging surface means, generally designated 86, between adjacent cylindrical sections. Once disengaged axially, adjacent cylindrical sections may be relatively rotated to change the relative positioning of the sound track portions of the adjacent record parts.

The foregoing detailed description has been given for clearness of understanding only and no unnecessary limitations should be understood therefrom as some modifications will be obvious to those skilled in the art.

I claim:

1. A sound record generally of the disc-type having a generally flat playing area on which a sound track is disposed with the playing area being revolvable about an axis generally perpendicular thereto, including a plurality of concentric record parts annularly adjustable one with respect to the other about said axis, one of the record parts having at least one sound track portion in position for registry with any one of a plurality of sound track portions on another record part to provide a sound track extending over both record parts, thereby providing for changing of the sound track in response to said relative rotational adjustment of the record parts to change the registry of the respective sound track portions thereon, the outer circular periphery of an inner record part being in sufficiently close proximity to the inner circular periphery of an immediately adjacent outer record part at a joint to permit a stylus or other appropriate sound pickup unit to pass from one record part to another, and means to releasably hold said record parts together for conjoint rotation about said axis.

2. The sound record of claim 1 including means to release said lock means automatically in response of relative axial movement of the record parts to permit said relative adjustment of the record parts.

3. A sound record generally of the disc-type having a generally flat playing area on which a sound track is disposed with the playing area being revolvable about an axis generally perpendicular thereto, including a plurality of concentric record parts annularly adjustable one with respect to the other about said axis, one of the record parts having at least one sound track portion in position for registry with any one of a plurality of sound track portions on another record part to provide a sound track extending over both record parts, thereby providing for changing of the sound track in response to said relative rotational adjustment of the record parts to change the registry of the respective sound track portions thereon, the outer circular periphery of an inner record part being in sufficiently close proximity to the inner circular periphery of an immediately adjacent outer record part at a joint to permit a stylus or other appropriate sound pickup unit to pass from one record part to another, one of said record parts having a circular peripheral portion at said joint overlapping the other record part to facilitate the sound pickup unit passing from said one record part to the other adjoining record part, and means to releasably hold said record parts together for conjoint rotation about said axis.

4. The sound record of claim 3 wherein said circular peripheral portion of said one record part is sloped toward the other record to facilitate movement of the stylus or other appropriate pickup unit from said one record part to the other.

5. The sound record of claim 3 wherein said circular peripheral portion of said one record part is devoid of recorded messages thereon.

6. The sound record of claim 5 wherein said circular peripheral portion of said one record part has unrecorded groove portions forming a continuation of the sound track to provide a lead into the sound track on the other record part.

7. A sound record generally of the disc-type having a generally flat playing area on which a sound track is disposed with the playing area being revolvable about an axis generally perpendicular thereto, including a plurality of concentric record parts annularly adjustable one with respect to the other about said axis, one of the record parts having at least one sound track portion in position for registry with any one of a plurality of sound track portions on another record part to provide a sound track extending over both record parts, thereby providing for changing of the sound track in response to said relative rotational adjustment of the record parts to change the registry of the respective sound track portions thereon, the outer circular periphery of an inner record part being in sufficiently close proximity to the inner circular periphery of an immediately adjacent outer record part at a joint to permit a stylus or other appropriate sound pickup unit to pass from one record part to another, one of said record parts having a circular peripheral portion sloped toward the other record part to facilitate movement of the stylus or other appropriate pickup unit from said one record part to the other adjoining record part, and means to releasably hold said record parts together for conjoint rotation about said axis.

8. The sound record of claim 7 wherein said circular peripheral portion of said one record part is devoid of recorded messages thereon.

9. A sound record including a plurality of record parts adjustable one with respect to the other, one of the record parts having at least one sound track portion from which a stylus or other appropriate sound pickup unit may pass to one of a plurality of sound track portions on another record part to provide a sound track extending over both record parts, thereby providing for changing of the sound track in response to said adjustment of the record parts to change the relative positions of the respective sound track portions thereon, the adjacent peripheries of the record parts being in sufficiently close proximity to each other at a joint to permit the stylus or other appropriate sound pickup unit to pass from one record part to another, and means to releasably hold said record parts together for sound reproduction purposes, said record parts are generally concentric and revolvable about a common axis for sound reproduction purposes, the record parts are adjustable one with respect to the other about said axis, and said last named means releasably holds the record parts together for conjoint rotation about said axis.

* * * * *

UNITED STATES PATENT OFFICE
CERTIFICATE OF CORRECTION

Patent No. 3,801,110 Dated April 2, 1974

Inventor(s) GUNARS LICITIS

It is certified that error appears in the above-identified patent and that said Letters Patent are hereby corrected as shown below:

Claim 4, line 3, after "record" insert --part--.

Signed and sealed this 10th day of September 1974.

(SEAL)
Attest:

McCOY M. GIBSON, JR.
Attesting Officer

C. MARSHALL DANN
Commissioner of Patents